United States Patent
Eo et al.

(10) Patent No.: US 11,067,679 B2
(45) Date of Patent: Jul. 20, 2021

(54) NARROW-BAND RADAR DEVICE AND OPERATION METHOD THEREOF

(71) Applicant: Electronics and Telecommunications Research Institute, Daejeon (KR)

(72) Inventors: Ik Soo Eo, Daejeon (KR); Bon Tae Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 445 days.

(21) Appl. No.: 15/956,305

(22) Filed: Apr. 18, 2018

(65) Prior Publication Data

US 2018/0348355 A1 Dec. 6, 2018

(30) Foreign Application Priority Data

May 30, 2017 (KR) .......................... 10-2017-0067096

(51) Int. Cl.
| | |
|---|---|
| *G01S 13/32* | (2006.01) |
| *G01S 13/34* | (2006.01) |
| *H01Q 21/06* | (2006.01) |
| *G01S 13/58* | (2006.01) |
| *G01S 13/87* | (2006.01) |
| *G01S 7/02* | (2006.01) |

(52) U.S. Cl.
CPC ............ *G01S 13/325* (2013.01); *G01S 13/34* (2013.01); *G01S 13/58* (2013.01); *G01S 13/87* (2013.01); *H01Q 21/061* (2013.01); *G01S 7/023* (2013.01)

(58) Field of Classification Search
None
See application file for complete search history.

(56) References Cited

U.S. PATENT DOCUMENTS

| | | | |
|---|---|---|---|
| 7,151,478 B1 | 12/2006 | Adams et al. | |
| 9,013,347 B2 | 4/2015 | Park et al. | |
| 9,575,159 B2 | 2/2017 | Lee | |
| 2010/0328157 A1 | 12/2010 | Culkin et al. | |
| 2015/0192665 A1 | 7/2015 | Lim et al. | |
| 2015/0212195 A1* | 7/2015 | Lee ........................ | G01S 13/42 |
| | | | 342/129 |

FOREIGN PATENT DOCUMENTS

| | | |
|---|---|---|
| JP | 2016-045211 A | 4/2016 |
| KR | 10-2007-0114149 A | 11/2007 |
| KR | 10-2012-0116335 A | 10/2012 |
| KR | 10-1343982 B1 | 12/2013 |
| KR | 10-1492367 B1 | 2/2015 |
| KR | 10-2015-0083306 A | 7/2015 |

* cited by examiner

*Primary Examiner* — Whitney Moore
(74) *Attorney, Agent, or Firm* — Rabin & Berdo, P.C.

(57) ABSTRACT

Provided is a narrow-band radar device including an orthogonal code generator configured to generate a plurality of orthogonal generators, a pseudo-noise code generator configured to generate a plurality of pseudo-noise codes, a radar transmitter configured to spread-modulate transmission data using the plurality of orthogonal codes and pseudo-noise codes, and a radar receiver configured to demodulate a reception signal using the plurality of orthogonal codes and pseudo-noise codes, and calculate at least one of an azimuth angle, elevation angel, speed, or range of a target from the demodulated reception signal.

15 Claims, 9 Drawing Sheets

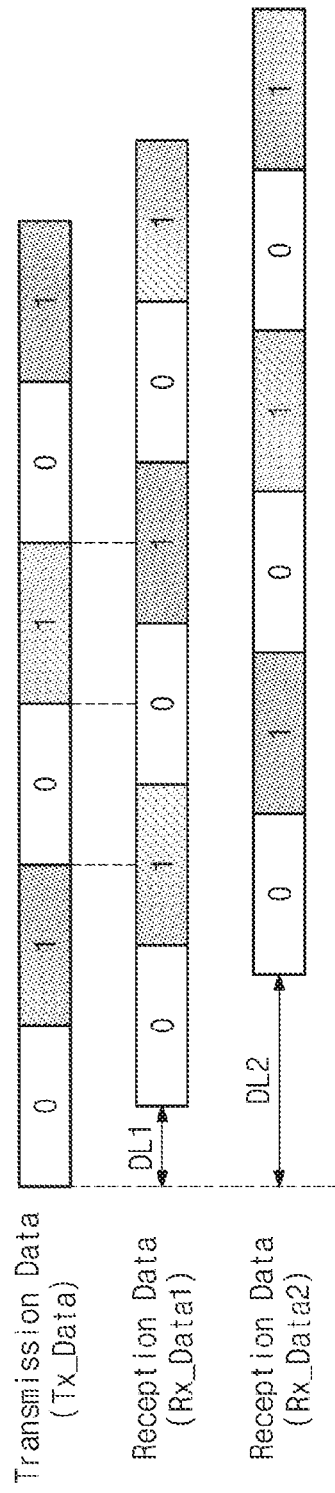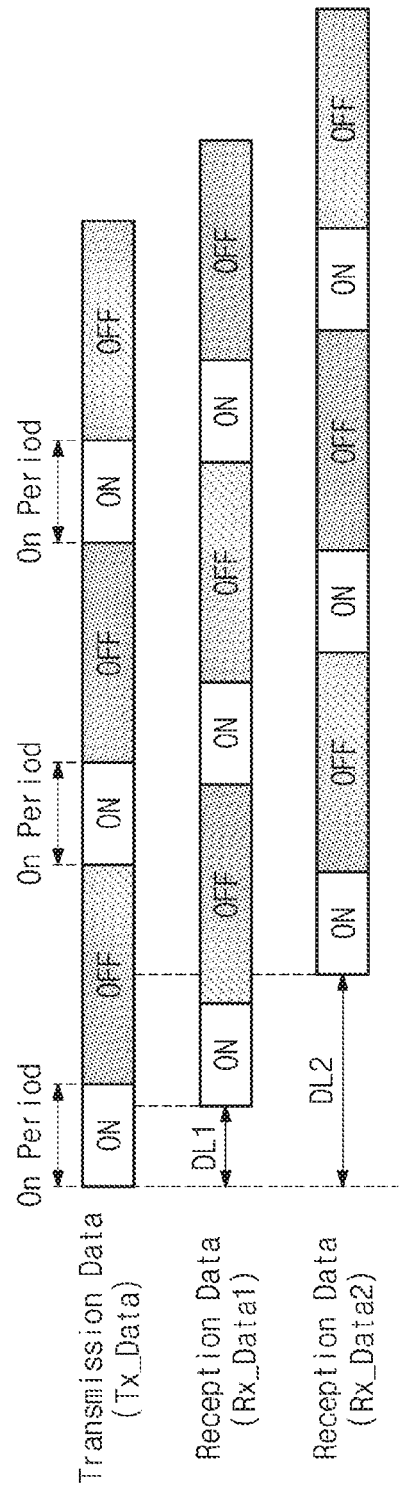

NARROW-BAND RADAR DEVICE AND OPERATION METHOD THEREOF

CROSS-REFERENCE TO RELATED APPLICATIONS

This U.S. non-provisional patent application claims priority under 35 U.S.C. § 119 of Korean Patent Application No. 10-2017-0067096, filed on May 30, 2017, the entire contents of which are hereby incorporated by reference.

BACKGROUND

The present disclosure herein relates to a radar device, and more particularly, to a narrow-band radar device using a transmission signal and reception signal in a narrow band and an operating method thereof.

A typical radar device emits a frequency-modulated continuation wave or pulse-modulated wireless signal. The radar device receives a signal reflected by a target and calculates a range, azimuth angle and elevation angle of the target. And the radar device measures a frequency change of the reflected and received signal according to a moving speed of the target, and obtains the speed of the target.

Since the radar device receives the signal reflected by the target, power of the reception signal is inversely proportional to the range R to the power of 4. When the number of targets to be searched increases, interference between signals reflected by the targets may be increased. In this case, it becomes difficult to detect an accurate location of the target by the interference between the reception signals. Accordingly, the radar device controls a transmission beam direction through a delay or gain control of a transmission signal in order to increase transmission power.

A typical radar device mainly uses a wide-band transmission signal. Accordingly, for a wide-band radar device, it is difficult to calculate an accurate location and speed of a target, since the wide-band radar device is weak to a jamming signal and a thermal noise included in a reception signal is large. In addition, since the wide-band radar device transmits/receives a wide-band signal, there is a limitation in that complexity of a transmitter/receiver becomes increased.

SUMMARY

The present disclosure provides a radar device and an operation method thereof capable of precisely detecting a location and speed of a target using a narrow-band transmission/reception signal. In other words, a radar device according to the inventive concept may provide a target location and speed of high reliability by reducing a noise included in a reception signal and reducing an influence of a jamming signal by means of a narrow-band transmission/reception signal.

An embodiment of the inventive concept provides a narrow-band radar device including: an orthogonal code generator configured to generate a plurality of orthogonal generators; a pseudo-noise code generator configured to generate a plurality of pseudo-noise codes; a radar transmitter configured to spread-modulate transmission data using the plurality of orthogonal codes and pseudo-noise codes; and a radar receiver configured to demodulate a reception signal using the plurality of orthogonal codes and pseudo-noise codes, and calculate at least one of an azimuth angle, elevation angel, speed, or range of a target from the demodulated reception signal.

In an embodiments of the inventive concept, an operation method of a narrow-band radar device includes: spread-modulating transmission data with an orthogonal code and pseudo-noise code and executing a first search mode for searching a search period; spread-modulating the transmission data with the orthogonal code and pseudo-noise code according to an execution result of the first search mode to transmit a spread-modulated result, and executing a second search mode in which an integration period of the reception signal is increased than that of the first search mode; and tracking a target detected according to an execution result of the second search mode using a transmission signal spread-modulated with the orthogonal code and pseudo-noise code.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 6 is a timing diagram exemplarily showing transmission data and reception data having different delays;

FIG. 7 is a timing diagram showing examples of transmission data and reception data having different delays;

DETAILED DESCRIPTION

The foregoing description and the following detailed description are all illustrative of the inventive concept, an additional description of the claimed invention should be considered to be provided. It is to be understood that both the foregoing description and the following detailed description are merely illustrative examples of various aspects and embodiments, and are intended to provide an overview or framework for understanding the nature and character of the claimed aspects and embodiments. Accordingly, the present invention is not limited to the following embodiments but embodied in other types. Rather, these embodiments are provided so that this disclosure will be thorough and complete, and will fully convey the scope of the present invention to those skilled in the art. Throughout this specification, like numerals refer to like elements.

Throughout this specification, when an element is referred to as "including" a component, it does not preclude another component but may further include the other component unless the context clearly indicates otherwise. In addition, an embodiment described and exemplified herein also includes a complementary embodiment thereof. Hereinafter, embodiments of the present disclosure are described in detail with reference to the accompanying drawings.

Figure 1:
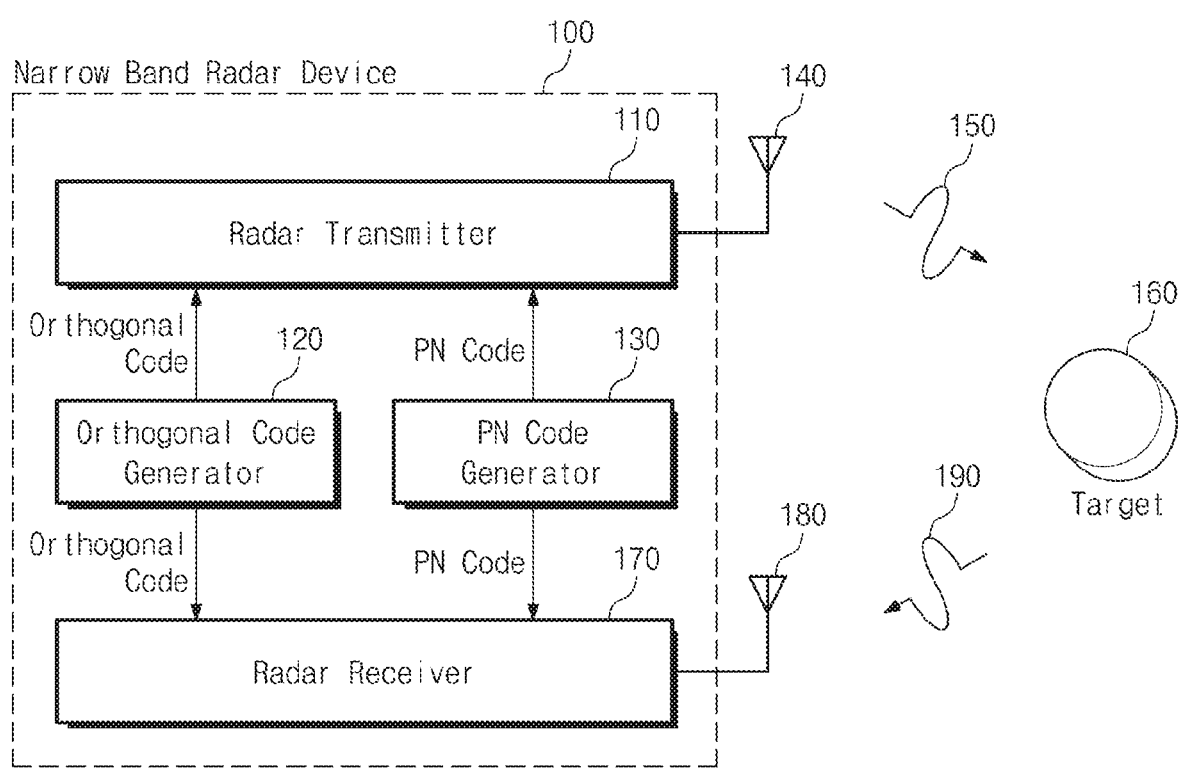
FIG. 1 illustrates a narrow-band radar device of an embodiment of the inventive concept.

FIG. 1 illustrates a narrow-band radar device of an embodiment of the inventive concept. Referring to FIG. 1, the narrow-band radar device 100 of the inventive concept includes a radar transmitter 110, an orthogonal code generator 120, a PN code generator 130, a transmitting antenna 140, a radar receiver 170, and a receiving antenna 180.

The radar transmitter 110 may spread a spectrum of transmission data to generate a transmission signal 150. The radar transmitter 110 may spread-modulate the transmission data using an orthogonal code and pseudo-noise (PN) code. The spread-modulated transmission data may be modulated to a wireless frequency and transmitted through the transmitting antenna 140. Here, although the number of the transmitting antenna 140 of the radar transmitter 110 is shown as one, it would be well understood that the transmitting antenna 140 may be in plurality. The transmission signal emitted through the transmitting antenna 140 is reflected by a target 160 and then is received through the receiving antenna 180.

The radar transmitter 110 according to the inventive concept may spread-modulate the transmission data using orthogonal codes respectively corresponding to the transmitting antennas. Here, as the orthogonal codes, a plurality of orthogonal codes may be used respectively corresponding to the number of the transmitting antenna. The transmission signals modulated with different orthogonal codes will be transmitted through different transmitting antennas. Since spatial identification of the transmission signals 150 is enabled using the orthogonal codes, a signal processing gain may be provided.

The transmission signals 150 spread-modulated with the orthogonal codes may be reflected by a plurality of targets and received with different delays. In this case, the orthogonal property between the reception signals may be deteriorated. Accordingly, when additional spread-modulation is performed using a PN code, deterioration of the orthogonal property may be compensated.

The orthogonal code generator 120 generates a plurality of orthogonal codes for spatial identification of respective transmitting antennas used in the radar transmitter 110. The transmission data transmitted to the respective transmitting antennas may be spread-modulated with the plurality of generated orthogonal codes. In addition, the generated orthogonal codes may also be provided to the radar receiver 170 in which the signals reflected by the target 160 and received are decoded.

The PN code generator 130 may generate one or more pseudo-noise codes or pseudo-random number codes. Hereinafter, the pseudo-noise code, pseudo-random number code, and pseudo random binary sequence (PRBS), etc., are simply called as a PN code. The PN code generator 130 may generate and provide a PN code to the radar transmitter 110 and the radar receiver 170. For example, the PN code generator 130 may generate at least any one of a gold code, an M-sequence, or a Walsh code.

The radar receiver 170 processes a reception signal 190 received through the receiving antenna 180 to calculate an elevation angle, an azimuth angle, a range, and a speed, etc., of the target. The radar receiver 170 may recover reception data using the orthogonal code from the orthogonal code generator 120 and the PN code from the PN code generator 130. In addition, the radar receiver 170 processes the transmission data and the recovered reception data through correlation. The radar receiver 170 may obtain the magnitude of a delay through the correlation and, by combining the obtained result, calculate the elevation angle, the azimuth angle, the range, and the speed, etc., of the target.

The narrow-band radar device 100 according to the inventive concept may modulate the transmission data using codes generated from the orthogonal code generator 120 and the PN code generator 130, and demodulate the reception data. Through the modulation of the transmission data using the orthogonal code, orthogonality between the transmission signals may also be maintained in a narrow-band. In addition, through the PN code, deterioration of the orthogonality may be complemented between the reception signals received with different delays.

Hereinafter, a description will be provided in detail about an operation principle of the above-described narrow-band radar device 100. It is assumed that the number of transmitting antennas 140 of the radar transmitter 110 is 'Nt' and the number of the receiving antennas 180 is 'Nr'. At this point, when the numbers of the transmitting antenna 140 and the receiving antennas 180 are respectively 1 (namely, Nt=Nr=1), the narrow-band device 100 may not obtain an azimuth angle or an elevation angle and may only obtain a range and speed.

When the receiving antenna 180 is in plurality and linearly arranged, the narrow-band radar device 100 may obtain only one of the azimuth angle or elevation angle. When the receiving antenna 180 is in plurality and two-dimensionally arranged, the narrow-band radar device 100 may obtain both of the azimuth angle and elevation angle. The range and Doppler frequency may be obtained in all cases regardless of the arrangement of the receiving antenna 180.

The narrow-band radar device 100 may selectively calculate the location (the range, azimuth angle, and elevation angle) of the target 160, and speed and acceleration information. When the transmitting antenna 140 is provided in plurality, the narrow-band radar device 100 may emit different transmission signals 150 through each of the plurality of transmitting antennas. In addition, the reception signals 190 that the transmission signals 150 are reflected by the target 160 and returned include all the transmission data having been transmitted from the transmitting antenna 140. Accordingly, when the reception signals 190 received by each of the receiving antennas 180 are recovered and processed, parallel incidence angles at which the reception signals 190 reflected by the target are incident to the receiving antenna 180 may be calculated.

In particular, when the reception signals 190 are received from a plurality of targets at the same time and the number of targets increases, or when a target is located relatively near, it is not easy to calculate the location accurately. Furthermore, signal quality of the reception signals 190 may be lowered because of a thermal noise or a jamming signal, and the intensities thereof are also reduced by various causes such as scattering in the air or a loss in antenna matching. Accordingly, since the signal-to-noise ratio (SNR) of the signal becomes small, the radar receiver 170 may use a signal processing algorithm such as Least Square (LS), Minimum Variance Distortionless Response (MVDR), or Multiple Signal Classification (MUSIC).

According to the inventive concept, due to application of the orthogonal code, the transmission signals 150 orthogonal to each other for each antenna 140 may be transmitted. Accordingly, an inter-signal interference between transmitting antennas 140 is removed, which provides an effect of increasing the intensities of the receptions signals 190.

Accordingly, a reception property of the reception signals 190 may be enhanced using the orthogonal code. In addition, when the orthogonal transmission signals 150 are reflected by the plurality of targets and received with different delays, the orthogonality may be deteriorated. In order to supplement this, delays according to ranges of the target may be measured using PN codes serially.

The range of the target 160 from the narrow-band radar device 100 may be expressed as Equation (1).

$$R = CT/2 \quad (1)$$

where C denotes the light speed, T denotes a delay time, and R denotes a range of the target. In other words, as the range R is farther, the delay time T from the target becomes long.

By selections of the length of the PN code and a chip duration, a maximum detection range $R_{max}$ of the narrow-band radar device 100 may be expressed as Equation (2).

$$R_{max} = kLT_C \quad (2)$$

where L denotes the length of the PN code, Tc denotes a chip period, and k denotes the number of observation codes.

Referring to Equation (2), it may be known that when the length (i.e. the chip period) of the reception signal increases, an observable range is extended.

In addition, a minimum detection range $R_{min}$ is determined by the chip period Tc and when the reception signals 190 are processed by dividing the chip period Tc, the resolution of the range R may be increased. The minimum detection range $R_{min}$ may be expressed as Equation (3).

$$R_{min} = T_C \quad (3)$$

The radar receiver 170 performs signal processing for obtaining incidence angles (horizontal angle and vertical angle) of the reception signal 190 received through the receiving antenna 180. In the signal processing for obtaining the incidence angles, the radar receiver 170 obtains the horizontal angle (corresponding to the azimuth angle) and the vertical angle (corresponding to the elevation angle) according to a preset incidence angle resolution. In order to obtain the incidence angles of high resolution, a relatively large amount of calculations is necessary. Accordingly, the incidence angle resolution may be largely influenced which is acquired according to a signal processing algorithm performed by the radar receiver 170.

The narrow-band radar device 100 obtains the speed of the target 160 using a Doppler frequency. A measurement time for the reception signal 190 in the radar receiver 170 may be expressed as Equation (4).

$$Tob = Nt \times Tc = (\text{number of snapshots}) \times L \times T_C \quad (4)$$

where Tob denotes an observation time, L denotes a code length, and 'number of snapshots' denotes the number of observation times. And Nt denotes a multiplication of the code length by the number of observation times. In the end, the observation time Tob is obtained by multiplying the chip period Tc by multiplication of a given code length L and the number of snapshots.

A minimum unit Doppler frequency $f_{unit}$ may be expressed as a reciprocal of the observation time (Tob=Nt× Tc) as shown in Equation (5).

$$f_{unit} = 1/(NtTc) \quad (5)$$

According to Equation (5), it may be known that the observation time Tob=Nt×Tc is required to be enlarged in order to obtain a smaller value of the minimum unit Doppler frequency $f_{unit}$.

A range of the Doppler frequency $f_D$ may be expressed as Equation (6).

$$-\frac{N}{2} \times f_{unit} \leq f_D \leq \left(\frac{N}{2} - 1\right) \times f_{unit} \quad (6)$$

where N denotes the number of samples selected from a signal of the length of 'Nt'.

The Doppler frequency $f_D$ has positive and negative frequency values according to the target speed. In other words, when the target is closer to the observation point, the Doppler frequency $f_D$ decreases, and when the target is farther from the observation point, the Doppler frequency $f_D$ increases. When the number N of samples selected from the reception signal of the length of 'Nt' during a given observation time, the Doppler frequency becomes increased and thus a speed measurement range of the target may increase. All data obtained during an entire observation time may be used, but only data selected in a necessary observation range may be sufficiently used for acquiring target information.

A target speed $v_t$ may be expressed as Equation (7).

$$v_t = f_D C/2 f_C \quad (7)$$

where, $f_D$ denotes a Doppler frequency, $f_c$ denotes a carrier wave frequency, and C denotes the light speed. The target speed $V_t$ may be obtained by obtaining the Doppler frequency $f_D$ and substituting the obtained result to Equation (7).

As the transmission signal 140 of the narrow-band radar device 100, a signal generated by spread-modulating the transmission data with the orthogonal code, and then spread-modulating again with the PN code. In addition, in order to propagate, through the air, the signal sequentially modulated with the orthogonal code and the PN code, an RF signal is mixed therewith and applied to the transmitting antenna 140. The transmission data may be used as a signal for calculating the location and speed information of the target or for message communication.

When spreading is performed only with the orthogonal code, orthogonality of reception signals that have been reflected by different targets and received by the receiving antenna 180 may be easily broken. In this case, a significant amount of noise may be included in the reception signals 190. In order to remove such noises, the reception signals are separated according to the delays using the PN codes, the separated signals are divided into orthogonal components, and then the azimuth angle, elevation angle, and speed of the target may be calculated.

Figure 2:
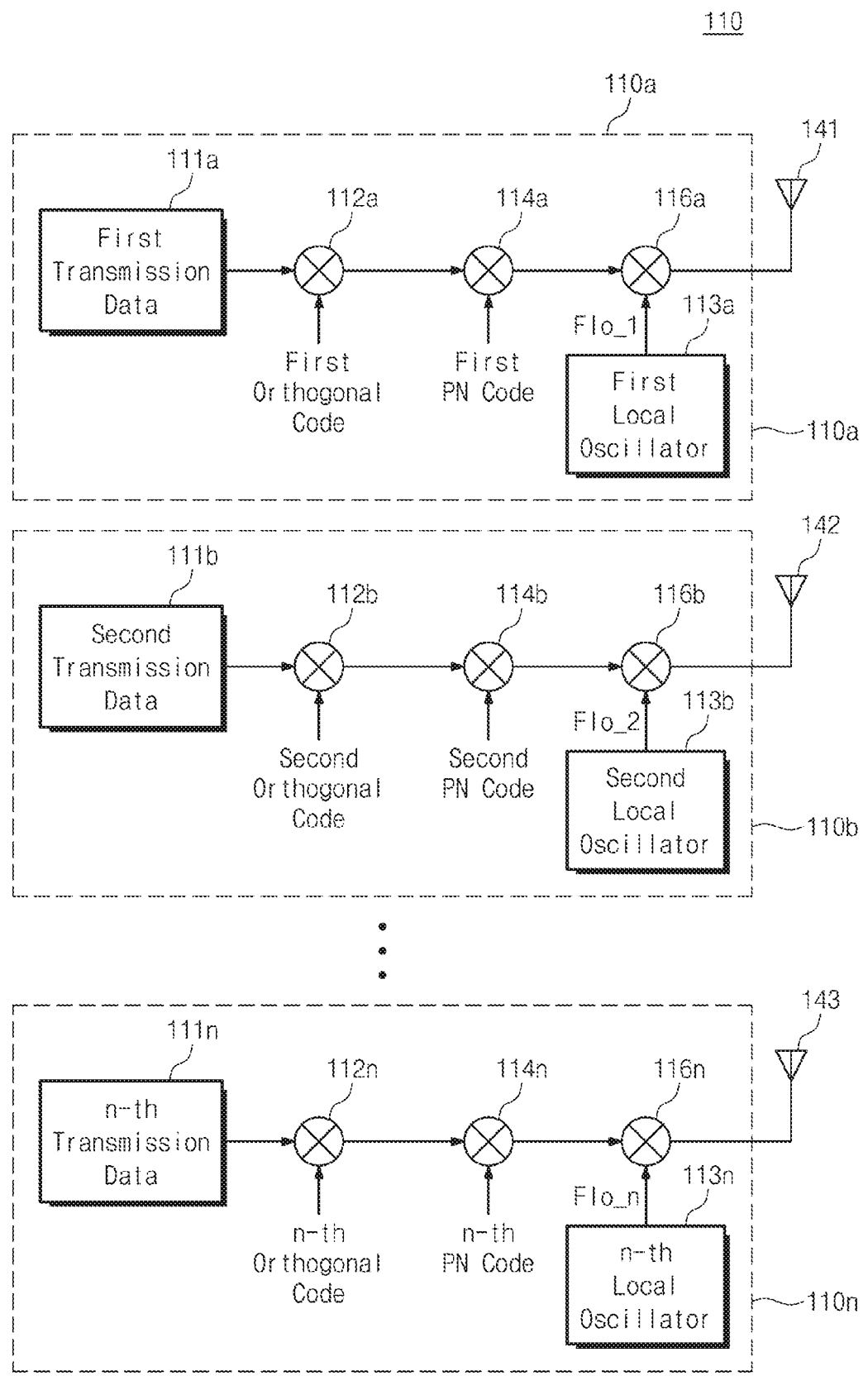
FIG. 2 is a block diagram showing an embodiment of a radar transmitter in the inventive concept.

FIG. 2 is a block diagram showing an embodiment of a radar transmitter in the inventive concept. Referring FIG. 2, the radar transmitter 110 may include a plurality of transmission blocks 110a, 110b to 110N corresponding to variously arrayed transmitting antennas 141, 142, and 143.

The first transmission block 110a spread-modulates first transmission data 111a to a wireless frequency Flo_1 with a first orthogonal code and a first PN code to provide the same to the first transmitting antenna 141. To this end, the first transmission block 110a may include modulators 112a, 114a, and 116a, and a first local oscillator 113a. The first transmission data 111a is multiply-modulated with the first orthogonal code by the modulator 112a. Viewed in the frequency domain, the first transmission data 111a is spread-modulated with a spectrum of the first orthogonal code. Then the signal spread-modulated with the first orthogonal code is multiply-modulated with the first PN code by the modulator 114a. Then a signal spread-modulated with the first PN code is modulated to the wireless frequency Flo_1 by the modulator 116a to be transmitted through the first transmitting antenna 141.

According to the same configuration and modulation scheme as those of the first transmission block 110a, the second transmission data 111b to the n-th transmission data 111n are spread-modulated by orthogonal codes and PN codes, and then transmitted through the corresponding transmitting antennas 142 and 143. Using the first to n-th transmission blocks 110a, 110b to 110n, the transmitting antennas 141, 142, and 143 may be formed in various arrays.

Here, the first to n-th orthogonal codes used in respective unit transmission blocks 11a, 11b to 11n may include the same sequence or different sequences from each other according to a purpose of use. Furthermore, the first to n-th PN codes used in the respective unit transmission block 11a, 11b to 11n may include the same sequence or different sequences from each other according to a purpose of use. In addition, it will be well known that the first to n-th transmission data used in the respective unit transmission blocks 11a, 11b to 11n may include the same sequence or different sequences from each other according to a purpose of use. In addition, the wireless frequencies Flo_1 to Flo_n provided from the first to n-th local oscillators, which are included in the respective unit transmission blocks 11a, 11b to 11n, may also be the same or different from each other.

Here, the transmission data 111a, 111b to 111n may be set according to a use mode. In other words, any one piece of transmission data may be consecutively transmitted through any one transmitting antenna. When the transmission data is continuously transmitted, the transmission signals 150 are distinguishable in a scheme that the transmitting antennas 141, 142, and 143 respectively transmit different pieces of transmission data. The transmission signals 150 are reflected by the target 160 and delayed and received by the radar receiver 170. At this point, even for a large delay, when a correlation between the transmission signals and the reception signals is calculated, it may be detected when the delay exceeds one code length.

Figure 3:
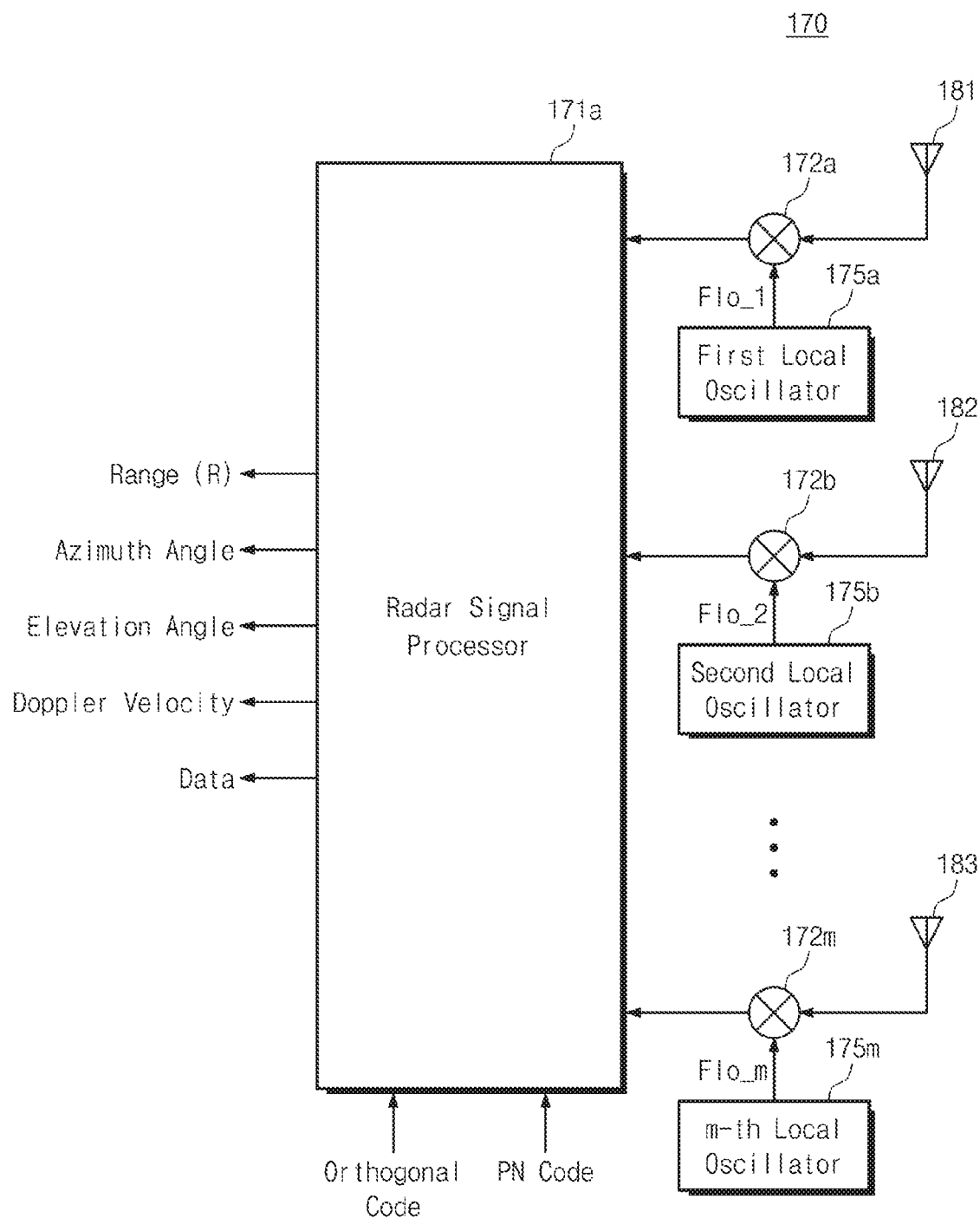
FIG. 3 is a block diagram showing an embodiment of a radar receiver in the inventive concept.

FIG. 3 is a block diagram showing an embodiment of a radar receiver in the inventive concept. Referring to FIG. 3, the radar receiver 170 according to an embodiment may include a radar signal processor 171a, demodulators 172a, 172b, and 172m, local oscillators 175a, 175b, and 175m, and a plurality of receptions antennas 181, 182, and 183.

The reception signals received from the receiving antennas 181, 182, and 183 may be demodulated by the demodulators 172a, 172b, and 172m and the local oscillators 175a, 175b, and 175m. The demodulated reception signals are provided to the radar signal processor 171a. The radar signal processor 171a may sample the demodulated reception signals and analyze the target using the sampled signals. For example, the radar signal processor 171a may extract the range R, azimuth angle, elevation angle, Doppler frequency, and data using relationships of Equations 1 to 7.

First, carrier wave components of the reception signals received from the receiving antennas 181, 182, and 183 may be removed by the demodulators 172a, 172b, and 172m and the local oscillators 175a, 175b, and 175m. The radar signal processor 171a processes the carrier-component-removed reception signals to output a signal according to the range of the target and a signal according to the incidence angle. In addition, the Doppler frequency $f_D$ may be obtained from each of the reception signals and a target speed may be obtained using the Doppler frequency $f_D$.

The reception signals in a baseband from which the carrier wave components are removed are synchronization-detected by multiplication with the PN codes and orthogonal codes by the radar signal processor 171a. In this process, a spectrum of an interference signal or a noise signal, which has a low correlation with the PN codes and orthogonal codes, may be spread. Accordingly, an influence of the noise and interference may be restricted in the reception signal. The radar signal processor 171a may identify signals transmitted from an identical antenna using the orthogonal codes. In addition, in a case where the PN codes are used, when an identical transmission signal is reflected by different targets and received, magnitudes of delays may be efficiently calculated. When reception signals having an identical PN code are analyzed, ranges of the targets may be precisely measured.

Figure 4:
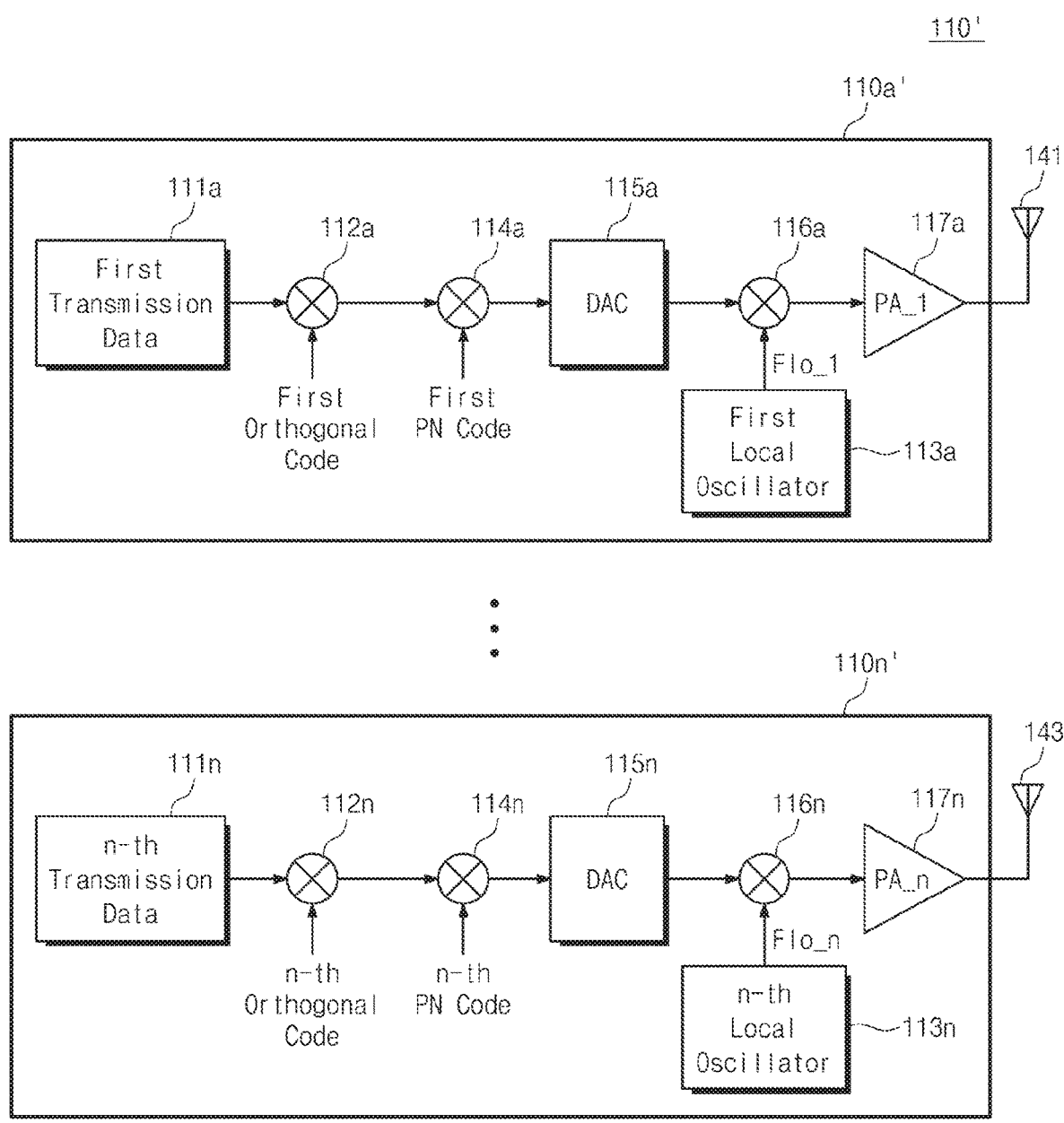
FIG. 4 is a block diagram showing a radar transmitter according to another embodiment of the inventive concept.

FIG. 4 is a block diagram showing a radar transmitter according to another embodiment of the inventive concept. Referring to FIG. 4, a data transmitter 110' according to another embodiment may include a plurality of transmission blocks 110a', 110b' to 110n' corresponding to variously arrayed transmitting antennas 141, 142, and 143.

The first transmission block 110a' spread-modulates the first transmission data 111a using a first orthogonal code and a first PN code. The spread-modulated first transmission data is converted to an analog signal by a first digital-to-analog converter 115a. The analog signal converted from the first transmission data is modulated to a wireless frequency Flo_1. Then signal power of the first transmission data 111a modulated to a wireless frequency band is amplified. After the power amplification, the first transmission data 111a is provided to the first transmitting antenna 141.

To this end, the first transmission block 110a' may include modulators 112a, 114a, and 116a, the first oscillator 113a, the first digital-to-analog converter 115a, and a first power amplifier 117a. For transmission, the first transmission data 111a is modulated using the first orthogonal code by the modulator 112a. The first transmission data 111a spread-modulated using the first orthogonal code is multiply-modulated with the first PN code by the modulator 114a. Then, the signal spread-modulated using the first PN code is converted to an analog signal by the first digital-to-analog converter 115a. The analog signal converted from the first transmission data 111a is modulated to the wireless frequency Flo_1 by the modulator 116a. The modulated wireless signal Flo_1 may be amplified by the first power amplifier 117a for wireless transmission. The amplified signal may be transmitted in a wireless frequency through the first transmitting antenna 141.

According to the same configuration and modulation scheme as the first transmission block 11a', the nth-transmission data 111n is spread-modulated using an orthogonal code and PN code and then transmitted through a corresponding transmitting antenna 143. When using the first to n-th transmission blocks 110a' to 110n', the transmitting antennas 141 to 143 may be formed in various arrays.

Here, the first to n-th orthogonal codes used in respective unit transmission blocks 110a' to 110n' may have an identical sequence or different sequences according to a purpose of use. Furthermore, the first to n-th PN codes used in each of the unit transmission blocks 110a' to 110n' may have an identical sequence or different sequences according to a purpose of use. In addition, it is also well understood that the first to n-th transmission data used in respective unit transmission blocks 110a' to 110n' may have an identical sequence or different sequences. In addition, the wireless frequencies provided from the first to n-th local oscillators used in the respective unit transmission blocks 110a' to 110n' may be an identical frequency or different frequencies.

Figure 5:
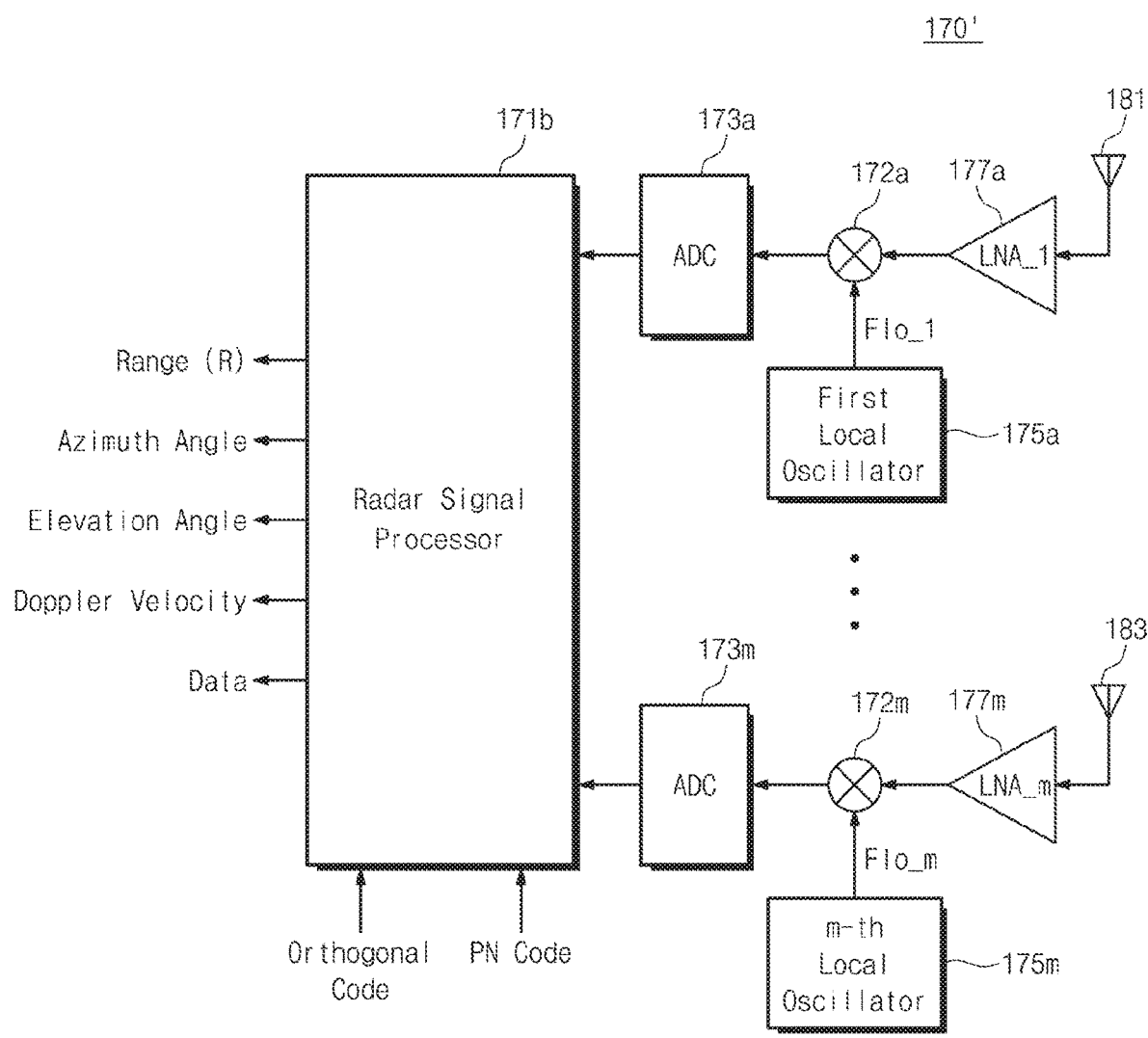
FIG. 5 is a block diagram showing another embodiment of a radar receiver in the inventive concept.

FIG. 5 is a block diagram showing another embodiment of a radar receiver in the inventive concept. Referring to FIG. 5, the radar receiver 170' according to the other embodiment may include a radar signal processor 171b, demodulators 172a to 172m, analog-to-digital converters 173a to 173m, local oscillators 175a to 175m, low noise amplifiers 177a to 177m, and a plurality of receiving antennas 181 to 183.

The signal intensities of reception signals received through the receiving antennas 181, 182, and 183 are relatively weak. Accordingly, the radar receiver 170' may amplify powers of the reception signals using the low-noise amplifiers 177a to 177m. Then, the reception signals are demodulated to baseband signals, and the demodulated baseband signals are converted to digital signals to be provided to the radar signal processor 171b. The radar signal processor 171b may analyze the target 160 (see FIG. 1) using the demodulated baseband signals. For example, the radar signal processor 171b may extract the range R, azimuth angle, elevation angle, speed, and data of the target 160 using the above-described Equations 1 to 7.

First, the powers of the reception signals received through the receiving antennas 181 to 183 are amplified by the low-noise amplifiers 177a to 177m. Carrier wave components of the amplified reception signals are removed by the demodulators 172a to 172m and the local oscillators 175a to 175m. The reception signals from which the carrier wave components are removed may be converted to digital signals in baseband by the analog-to-digital converters 173a to 173m. The radar signal processor 171b processes the digital signals to signals according to the range of target and signals according to the incidence angle. In addition, the Doppler frequency $f_D$ may be obtained from each of the digital signals, and the target speed may be obtained using the Doppler frequency $f_D$.

The digital signals in the baseband from which the carrier wave components are removed are multiplied by the PN codes and orthogonal codes to be synchronization-detected. In this process, a spectrum of an interference signal or a noise signal, which has a low correlation with the PN codes and orthogonal codes, may be spread. Accordingly, an influence of the noise and interference may be restricted in the reception signal. The radar signal processor 171b may identify a signal transmitted from an identical transmitting antenna using the orthogonal code. In addition, in a case where the PN codes are used, when an identical transmission signal is reflected by different targets and received, magnitudes of delays may be efficiently calculated. When reception signals having an identical PN code are analyzed, the ranges of the targets may be minutely measured.

FIG. 6 is a timing diagram exemplarily showing transmission data and reception data having different delays. In relation to FIG. 6, the narrow-band radar device 100 (see FIG. 1) may receive, with respect to identical transmission data, reception data having different delays DL1 and DL2 according to the location of the target.

The transmission data Tx_Data may be, if necessary, provided as binary data or non-binary data in various patterns. For example, the transmission data Tx_Data may be used for message communication. Alternatively, the transmission data Tx_Data may be configured from an identical pattern of a specific length and the identical pattern may be repetitively transmitted.

The reception data Rx_Data1 corresponds to a reception signal received when the transmission data Tx-Data is transmitted in a wireless manner and reflected by a first target. The reception data Rx-Data1 may be received which has been delayed with a first delay DL1 according to the range R to the narrow-band radar device 100. The magnitude of the first delay DL1 may be detected through a correlation between the reception data Rx_Data1 and the transmission data.

The reception data Rx_Data2 corresponds to a reception signal received when the transmission data Tx-Data is transmitted in a wireless manner and reflected by a second target. The reception data Rx-Data2 may be received which has been delayed with a second delay DL2 according to the range R to the narrow-band radar device 100. The second delay DL2 is relatively larger than the first delay DL1. This means that the second target is located relatively farther than the first target. The range of the target may be easily calculable using the magnitude of the delay.

Here, it is well known that the transmission data Tx_Data may not be continuously transmitted, but may be discontinuously transmitted. When the transmission data Tx_Data is discontinuously transmitted, a detection range may be variously adjusted by adjusting the length of a signal transmission period.

FIG. 7 is a timing diagram showing examples of transmission data and reception data having different delays. In relation to FIG. 7, the narrow-band radar device 100 may adjust a detection range of a target by setting an ON/OFF period in the transmission data.

The detection range of the target may be adjustable by setting the ON/OFF period in the transmission data Tx_Data. Here, the transmission data Tx_Data may be a transmission signal after modulation.

The reception data Rx-Data1 may be received which has been delayed with a first delay DL1 according to the range R to the narrow-band radar device 100. The reception data Rx-Data1 is received in the ON period of the transmission data Tx_Data reflected by the first target. And the reception data Rx_Data2 may be received with the magnitude of the second delay DL2. The receive data Rx-Data2 is received in the OFF period of the transmission data Tx_Data reflected by the second target. In the end, when the ON period of the transmission data or the transmission signal is made short, an observation time for the reflected and returned reception signal may become longer.

As described above, an increase in observation time means an increase in measurable range R. Accordingly, the transmission data may be configured from identifiable specific data, or a detection range of the target may be increased with the ON/OFF period in the transmission signal.

Figure 8:
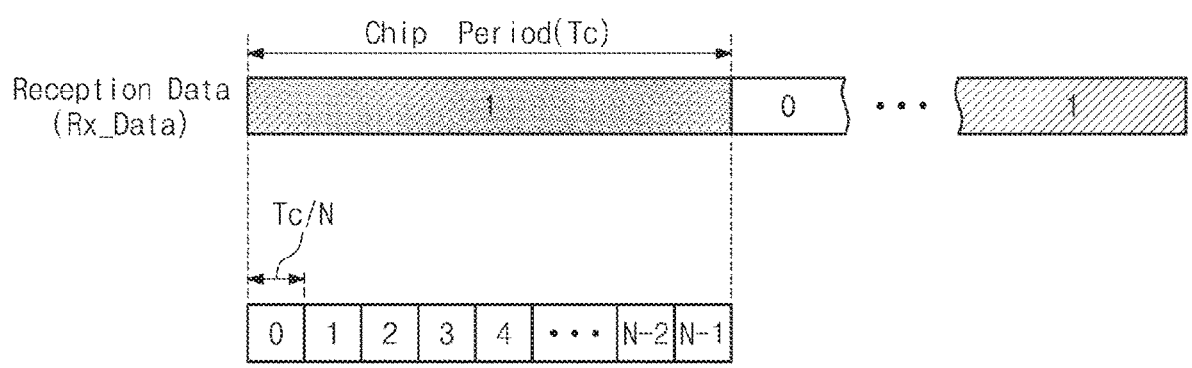
FIG. 8 schematically shows a method of setting a chip period for increasing a resolution of a detection range according to an embodiment of the inventive concept.

FIG. 8 schematically shows a method of setting a chip period for increasing a resolution of a detection range according to an embodiment of the inventive concept. In relation to FIG. 8, when processing the reception signal 190 (see FIG. 1) reflected by the target and returned, the resolution of the range detection may be increased by dividing one chip period into a plurality of time periods and performing processing.

When the number of divisions for dividing and processing one chip period is increased, the resolution of the range is also increased that much, but a calculation amount will also be increased for signal processing. However, when the chip period is divided and processed, a bandwidth required for the operation may be reduced and the range may be minutely detected.

The illustrated example shows that one chip period Tc is divided into N sub-periods to process the signal. Then detection periods increase and accordingly more minute periods may be obtained as small as the sub-period Tc/N. When the number N into which one chip period is divided is adjusted according to the purposed of use, the range resolution may be increased to accurately search for the target location.

Figure 9:
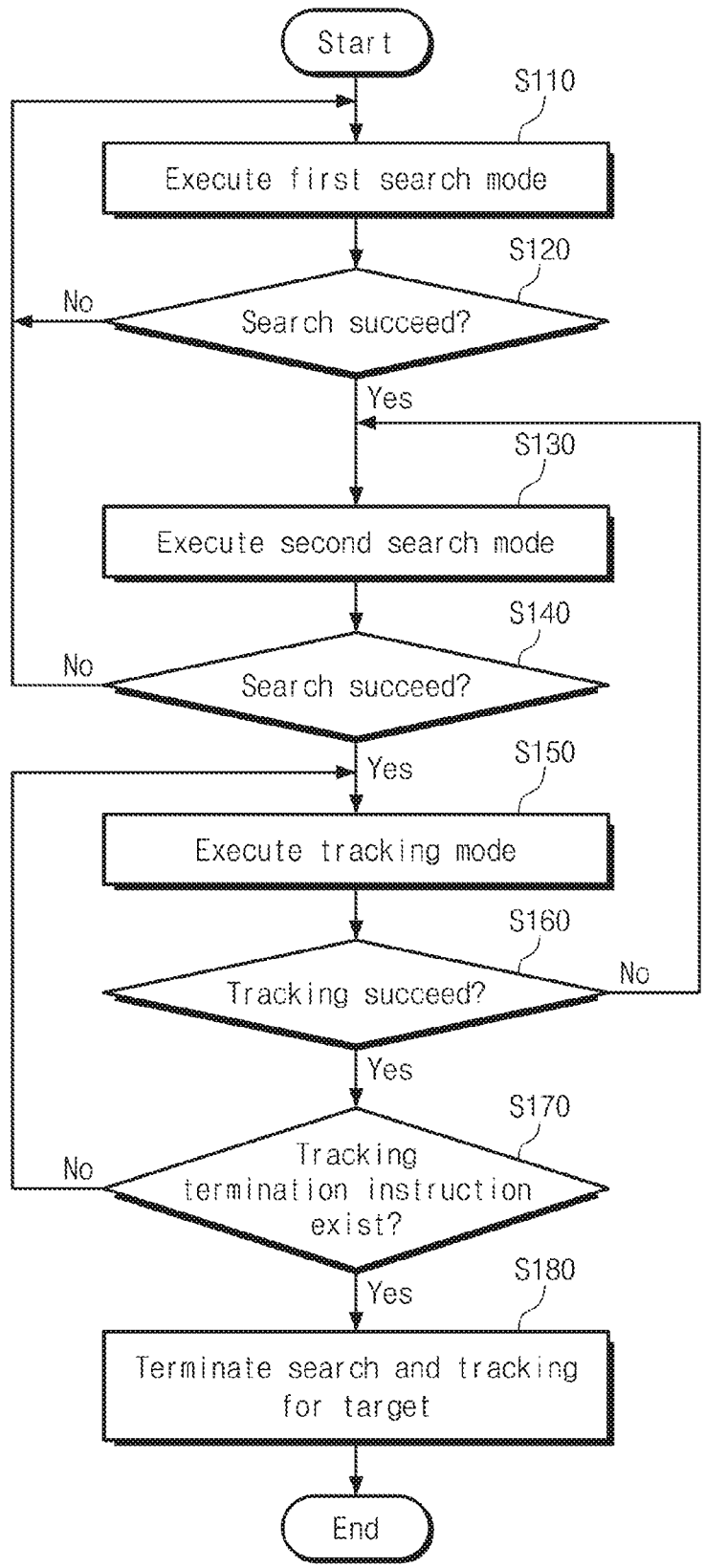
FIG. 9 is a flow chart exemplarily illustrating an operating method of a narrow-band radar device 100 according to an embodiment of the inventive concept.

FIG. 9 is a flow chart exemplarily illustrating an operating method of the narrow-band radar device 100 according to the inventive concept. In relation to FIG. 9, the narrow-band radar device 100 may execute a search mode for a target and a tracking mode for tracking the searched target.

In operation S110, the narrow-band radar device 100 may execute a first search mode. In other words, the narrow-band radar device 100 transmits the transmission data spread-modulated using the orthogonal codes and PN codes through the plurality of transmitting antennas 140. And then the narrow-band radar device 100 receives and processes a reception signal reflected and returned through the receiving antennas 190. The narrow-band radar device 100 may recover data of the reception signal using the orthogonal codes and PN codes, and determine whether the target exists. In a first search mode, a search period is widely designated and a detection reference value of the reception signal is set low to detect the targets as many as possible. However, the detection reference value is required to be set as a proper value such that excessive search errors do not occur.

In operation S120, the narrow-band radar device 100 performs an operation bifurcation according to an execution result of the first search mode. In other words, when a target exceeding the reference value exists in the set search period (Yes direction), it is determined that the search is successful and the procedure moves to operation S130. On the other hand, when a target exceeding the reference value does not exist in the set search period (No direction), it is determined that the search fails and then the procedure returns to operation S110.

In operation S130, the narrow-band radar device 100 executes a second search mode. The narrow-band radar device 100 transmits the transmission data spread-modulated using the orthogonal codes and PN codes through the plurality of transmitting antennas 140. And then the narrow-band radar device 100 receives and processes a reception signal reflected and returned through the receiving antennas 190. Data of the reception signal is recovered and it is determined whether the target exists. In the second search mode, the narrow-band radar device 100 may detect an accurate range, incidence angle, and speed of the target by making an integration period of the reception signal long to increase the magnitude of the signal.

In operation S140, the narrow-band radar device 100 performs an operation bifurcation according to an execution result of the second search mode. In other words, when a target exceeding the reference value exists in the set search period (Yes direction), it is determined that the search is successful and the procedure moves to operation S150. On the other hand, when a target exceeding the reference value does not exist in the set search period (No direction), it is determined that the search fails and then the procedure returns to operation S110. Here, it has been only described that when the execution result of the second search mode shows a search fail, the procedure moves to operation S110 for executing the first search mode, but the inventive concept is not limited thereto. In other words, it is well known that when the execution result of the second search mode shows the search fail, the procedure may be returned to operation S130.

In operation S150, the narrow-band radar device 100 executes the tracking mode. For executing the tracking mode for accurately tracking the target location and speed, the narrow-band radar device 100 may focus and transmit a beam of a transmission signal at the incidence angle found in the search mode, increase an integration period of the reception signal, minutely calculate the range, or perform calculation by increasing the resolution of the incidence angle.

In operation S160, when the target is locked on according to the tracking result, the narrow-band radar device 100 determines that the tracking is successful. Then the procedure moves to operation S170. On the other hand, when the target is not locked on and disappears according to the execution result of the tracking mode, the procedure moves to operation S130.

In operation S170, the narrow-band radar device 100 detects whether there is a tracking completion request for the target. For example, a case where the target is not determined as a tracking target by a user, or a case where the tracking is canceled according to a system request may correspond hereto. When there is not a tracking completion instruction, the procedure moves to operation S150 and the tracking operation will be continued. On the other hand, when there is the tracking completion instruction, the procedure moves to operation S180 to terminate the search and tracking operations of the narrow-band radar device 100.

Figure 10:
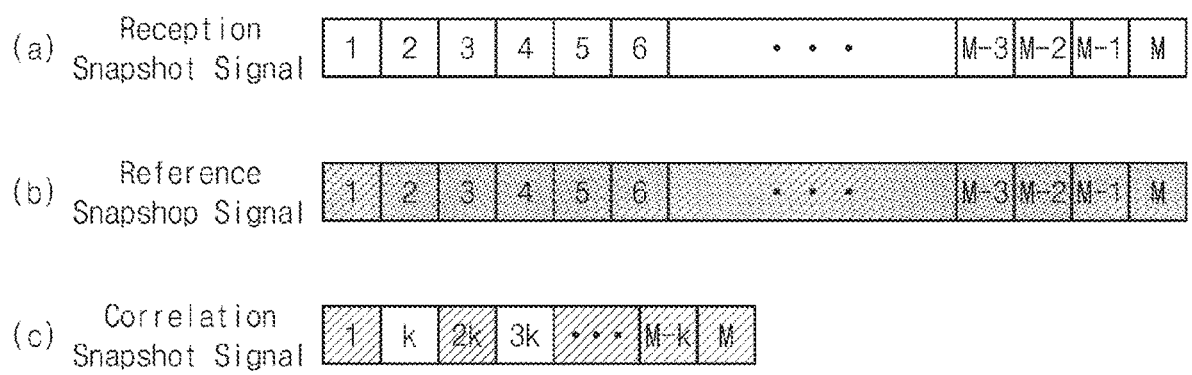
FIG. 10 illustrates a method of obtaining a Doppler frequency according to an embodiment of the inventive concept.

FIG. 10 illustrates a method of obtaining a Doppler frequency according to an embodiment of the inventive concept. In relation to FIG. 10, when a correlation calculation is performed between a received snapshot signal (a) and a reference snapshot signal (b), a correlation snapshot signal (c) is generated. When the correlation snapshot signal (c) is converted to a signal in a frequency domain, the Doppler frequency $f_D$ may be obtained.

The correlation snapshot signal (c) is not correlated with all the input signals, but is correlated in a necessary signal domain to be stored, and a correlation result is used for acquiring the Doppler frequency $f_D$. The Doppler frequency $f_D$ is represented as a frequency-shifted signal of the target in the time domain signal. Accordingly, a time domain signal may be obtained from a signal reflected by the target according to a time delay and incidence angle. In addition, the time domain signal obtained in this way may be Fourier-transformed to extract a frequency component. In the end, the time domain signal may be partially stored and processed according to a range of the frequency component included in the time domain signal.

According to an embodiment of the inventive concept, since using a narrow-band transmission and reception signal, a narrow-band radar device is robust to a noise and a transmitter/receiver therein may be configured in a simple structure. In addition, the narrow-band radar device processes a transmission and reception signal using an orthogonal code and pseudo-noise (or pseudo random number) code, and thus orthogonality and a signal gain may be increased.

Since a narrow-band radar device according to the inventive concept minutely estimates a delay of a pseudo noise (or pseudo random number) code, a range to a target may be accurately estimated using a narrow-band signal. In addition, since identifying a space using an orthogonal code, a narrow-band radar device according to the inventive concept may provide a signal processing gain. In addition, since a narrow-band radar device according to the inventive concept is able to generate a plurality of distinguishable transmission signals using a plurality of pseudo-noise codes, an efficient radar deployment is enabled.

Although an embodiment of the present disclosure has been described with reference to the accompanying drawings, it should be understood that those skilled in the art can carry out other modifications without changing its technical spirit or essential features.

What is claimed is:

1. A narrow-band radar device comprising:
an orthogonal code generator configured to generate a plurality of orthogonal codes;
a pseudo-noise code generator configured to generate a plurality of pseudo-noise codes;
a radar transmitter configured to spread-modulate transmission data using the plurality of orthogonal codes and pseudo-noise codes; and
a radar receiver configured to demodulate a reception signal using the plurality of orthogonal codes and pseudo-noise codes, and calculate at least one of an azimuth angle, elevation angle, speed, or range of a target from the demodulated reception signal;
wherein the radar receiver separates the reception signal according to an incidence angle and delay to perform Fourier-transform thereon, and samples a time domain signal according to a Fourier-transformed frequency component.

2. The narrow-band radar device of claim 1, wherein the radar transmitter comprises a plurality of transmitting antennas and the plurality of orthogonal codes have orthogonality between transmission signals respectively transmitted from the plurality of antennas.

3. The narrow-band radar device of claim 1, wherein the radar transmitter spread-modulates the transmission data using the plurality of orthogonal codes and then sequentially spread-modulates a spread-modulated result using the plurality of pseudo-noise codes.

4. The narrow-band radar device of claim 1, wherein the radar receiver comprises:
a first transmitting block configured to spread-modulate first transmission data with a first orthogonal code and a first pseudo-noise code, and transmit a spread-modulated result to a first transmitting antenna; and
a second transmitting block configured to spread-modulate second transmission data with a second orthogonal code and a second pseudo noise code, and transmit a spread-modulated result to a second transmitting antenna.

5. The narrow-band radar device of claim 4, wherein the first transmission data and the second transmission data have different data sequences from each other.

6. The narrow-band radar device of claim 4, wherein the first pseudo-noise code and the second pseudo-noise code have an identical bit sequence or different bit sequences.

7. The narrow-band radar device of claim 4, wherein the second transmission block comprises a second digital-to-analog converter configured to convert the second transmission data to an analog signal; a second wireless frequency modulator configured to modulate an output of the second digital-to-analog converter to a wireless frequency; and a second power amplifier configured to amplify power of an output of the second wireless frequency modulator to deliver an amplified result to the second transmitting antenna.

8. The narrow-band radar device of claim 1, wherein the transmission data is provided as non-continuous data in which an On period and an Off period are periodically repeated.

9. The narrow-band radar device of claim 8, wherein the radar transmitter adjusts a length of the On period or Off period according to a detection range for detecting the target.

10. The narrow-band radar device according to claim 1, wherein the radar receiver discontinuously samples and stores the time domain signal according to the frequency component.

11. The narrow-band radar device according to claim 1, wherein the radar receiver converts the discontinuously stored time domain signal to a frequency domain signal and calculates a Doppler frequency.

12. A narrow-band radar device comprising:
an orthogonal code generator configured to generate a plurality of orthogonal codes;
a pseudo-noise code generator configured to generate a plurality of pseudo-noise codes;
a radar transmitter configured to spread-modulate transmission data using the plurality of orthogonal codes and pseudo-noise codes; and
a radar receiver configured to demodulate a reception signal using the plurality of orthogonal codes and pseudo-noise codes, and calculate at least one of an azimuth angle, elevation angle, speed, or range of a target from the demodulated reception signal;
wherein the radar receiver comprises:
a first transmitting block configured to spread-modulate first transmission data with a first orthogonal code and a first pseudo-noise code, and transmit a spread-modulated result to a first transmitting antenna; and
a second transmitting block configured to spread-modulate second transmission data with a second orthogonal code and a second pseudo noise code, and transmit a spread-modulated result to a second transmitting antenna; and
wherein the first transmission block comprises a first digital-to-analog converter configured to convert the first transmission data to an analog signal; a first wireless frequency modulator configured to modulate an output of the first digital-to-analog converter to a wireless frequency; and a first power amplifier configured to amplify power of an output of the first wireless frequency modulator to deliver an amplified result to the first transmitting antenna.

13. A narrow-band radar device comprising:
an orthogonal code generator configured to generate a plurality of orthogonal codes;
a pseudo-noise code generator configured to generate a plurality of pseudo-noise codes;
a radar transmitter configured to spread-modulate transmission data using the plurality of orthogonal codes and pseudo-noise codes; and
a radar receiver configured to demodulate a reception signal using the plurality of orthogonal codes and pseudo-noise codes, and calculate at least one of an azimuth angle, elevation angle, speed, or range of a target from the demodulated reception signal;
wherein the radar receiver comprises:
a plurality of receiving antennas configured to receive the reception signal reflected by a target;
a plurality of demodulators configured to convert the reception signal received through each of the plurality of receiving antennas to a baseband signal; and
a radar signal processor configured to calculate, from the baseband signal, an incidence angle of the reception signal using the plurality of orthogonal codes, and detect a delay of the reception signal using the plurality of pseudo-noise codes.

14. The narrow-band radar device of claim 13, wherein the radar signal processor divides one chip comprised in the reception signal into two or more periods, and performs a detection and process.

15. The narrow-band radar device of claim 14, wherein the radar signal processor adjusts a number of periods into which the one chip is divided according to a predetermined resolution of the reception signal delay.

\* \* \* \* \*